Figure 1:
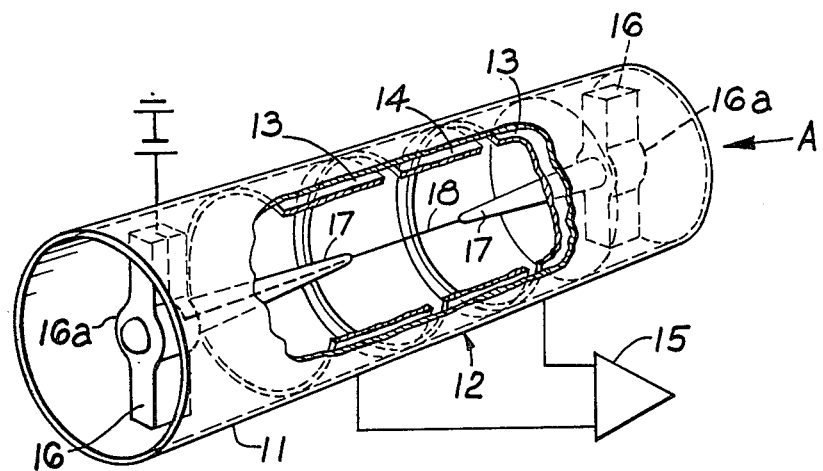

United States Patent [19]

Evans et al.

[11] 4,305,301

[45] Dec. 15, 1981

[54] MEASUREMENT OF THE MASS FLOW OF A LIQUID

[75] Inventors: Kenneth S. Evans, Blackpool; Charles P. Cockshott, Coventry; Christopher M. R. Pacaud, Shrewsbury, all of England

[73] Assignee: Lucas Industries Limited, Birmingham, England

[21] Appl. No.: 117,412

[22] Filed: Jan. 31, 1980

[30] Foreign Application Priority Data

Feb. 14, 1979 [GB] United Kingdom ............... 05147/79

[51] Int. Cl.$^3$ .............................................. G01F 1/56
[52] U.S. Cl. ................................................. 73/861.09
[58] Field of Search ..................... 73/861.09; 250/324; 324/453

[56] References Cited

U.S. PATENT DOCUMENTS 3,835,705 9/1974 Hadjidjanian ..................... 73/861.09
4,144,750 3/1979 Read ................................. 73/861.09
4,193,296 3/1980 Janka ................................ 73/861.09

FOREIGN PATENT DOCUMENTS 1340411 12/1973 United Kingdom .
1396995 6/1975 United Kingdom .

Primary Examiner—Herbert Goldstein
Attorney, Agent, or Firm—Ladas & Parry

[57] ABSTRACT

Apparatus for measuring the mass flow of a fluid comprises a hollow collector electrode assembly through which the fluid flows. The collector electrode assembly includes a central electrode disposed between and insulated from first and second outer electrodes. An ionizing electrode comprising a length of conductive wire is supported coaxially within the central collector electrode. A voltage source is provided for applying between the ionizing electrode and the collector electrode assembly a potential difference sufficient to ionize the fluid. The ions thereby produced at the ionizing electrode migrate towards the central collector electrode but are displaced in the direction of fluid flow by an amount dependent upon the mass flow of the fluid. A differential amplifier is responsive to the number of ions migrating to the outer collector electrodes to provide a measure of the displacement of the ions by the fluid flowing through the collector electrode assembly.

7 Claims, 2 Drawing Figures

MEASUREMENT OF THE MASS FLOW OF A LIQUID

This invention relates to the measurement of the mass flow of a fluid.

One known technique for measuring the mass flow of a fluid involves allowing the fluid to flow through a space defined between an ionising electrode and a collector electrode which is transversely spaced from the ionising electrode and which is normally formed in two parts separated by a narrow gap aligned with the ionising electrode. A high potential difference is generated between the ionising electrode and the collector electrode so that a corona discharge is produced at the ionising electrode. The ions produced by the corona discharge migrate towards the collector electrode, but as they migrate, they are displaced in the direction of fluid flow by an amount which has been shown to be dependent upon the mass flow of the fluid. Thus, by measuring the difference in the currents collected by the two parts of the collector electrode, a measure of the fluid mass flow can be obtained.

In one known device which makes use of the corona discharge technique, the ionising electrode consists of a disc which is sharpened at its periphery and which is mounted on the axis of a cylindrical casing so that its major surfaces extend perpendicular to the flow direction of the fluid which, in use, is passed through the casing. The collector electrode is in the form of a hollow cylinder which is located at the internal surface of the casing so as to be coaxial with the ionising electrode. However, this known device suffers from the disadvantage that the sharpened disc produces a narrow beam of ions and hence it is difficult to obtain an output from the device which varies generally linearly with fluid mass flow over a significant range of flow values. In order to alleviate this problem, it is known to produce the collector electrode in distributed form, for example as a resistive cylinder, as a plurality of collector rings interconnected by resistance elements, or as a closely wound helix of resistance wire. Another known solution to this problem is to shape the mutually presented edges of the collectors such that the area of each collector exposed to the ionising electrode varies with axial displacement from the ionising electrode. However, these arrangements increase the overall cost of the device, a problem which is exaggerated by the fact that the ionising electrode disc is normally machined from a solid block of a noble metal or alloy such as platinum or palladium/ruthenium. In addition, the operating voltage of this known device tends to be high, a typical value being 14 kV for a 2 inch diameter casing.

In a further known device, the ionising electrode is defined by a fine conductive wire which extends along the axis of a cylindrical casing so that its centre coincides with a narrow gap defined between a pair of hollow, cylindrical collector electrodes provided at the internal surface of the casing. Compared with said one known device employing a disc-shaped ionising electrode, this further device can be used at a lower operating voltage and involves lower material costs, the latter mainly being due to the smaller volume of the ionising electrode. Moreover, the use of a conductive wire as the ionising electrode produces a wider ionised beam of more uniform current density per unit length than that obtained with a disc electrode so that a substantially linear output can be obtained without the need for distributed collectors. It will, however, be apparent that, when the ion beam has been deflected by an amount equal to half the length of the conductive wire, the only current collected will be by the upstream collecting electrode and hence this represents the maximum flow which can be measured by the device. Although the length of the wire can be increased to cater for larger masses of fluid flow, this is undesirable since it increases material costs and also increases the tendency for the wire to sag so that it is no longer accurately aligned with the axis of the casing. Moreover, in this further known device, both collector electrodes receive current from the ionising electrode when the rate of flow of fluid through the device is zero and allowance for this must therefore be made in the electronics associated with the device, which necessarily increases the cost of the electronics.

A first object of the present invention is therefore to provide improved apparatus for measuring the mass flow of a fluid.

Accordingly, the invention resides in a first aspect in apparatus for measuring the mass flow of a fluid comprising a hollow, collector electrode assembly through which, in use, the fluid flows, the collector electrode assembly including a hollow, elongated central electrode disposed between and insulated from first and second hollow, elongated outer electrodes, the central and outer collector electrodes having their longitudinal axes substantially co-extensive and being spaced apart in the direction of said axes, an ionising electrode comprising a length of conductive wire supported within the collector electrode assembly so as to extend along the axis of the central collector electrode with its mid-point being disposed substantially half-way between the ends of the central electrode, the length of the conductive wire being at least equal to that of the central collector electrode, means for applying between the ionising electrode and the collector electrode assembly a potential difference sufficient to ionise the fluid, the ions thereby produced at the ionising electrode migrating towards the central collector electrode but being displaced in the direction of fluid flow by an amount dependent upon the mass flow of the fluid, and means responsive to the number of ions migrating to the outer collector electrodes for measuring the displacement of the ions by the fluid flowing through the collector electrode assembly.

In the apparatus described in the preceding paragraph, it will be apparent that, provided the length of each outer collector electrode is at least equal to the length of the wire ionising electrode, current collected by the upstream, outer collecting electrode will only reach a maximum when the deflection of the ion beam by the fluid flow is equal to the full length of the conductive wire. Thus the length of wire needed to cater for a given range of fluid mass flow is decreased as compared with the further known device described above, so that material costs can be decreased and the problem of the wire sagging can be reduced. Moreover, in the apparatus according to the first aspect of the invention, when the rate of flow of fluid through the device is zero, at least a major part of the current will be collected by the central collector electrode, whereas of course it is the outer collector electrodes which are used to measure the ionic displacement. Thus the electronics associated with the outer collector electrodes will experience little or no current under zero flow conditions and hence the electronics can be simplified.

It is, however, to be appreciated that it may be desirable to arrange that the conductive wire extends by a short distance beyond the ends of the central collector electrode since the profile of the ionic beam produced by the wire does not exhibit a sharp cut-off at each end of the wire, but rather tails off gradually at the wire ends. Thus, by ensuring that the wire projects slightly beyond the ends of the central collector electrode, it is possible to improve the linearity of the output at low values of fluid mass flow.

Preferably, the conductive wire is held in tension between a pair of conductive elements which are of generally frusto-conical configuration at their ends presented to said length of conductive wire. The use of this configuration for the wire support elements is found to produce a sharper cut-off in the ion beam at the ends of the conductive wire, as compared with support elements having generally square or curved ends.

In a second aspect, the invention resides in apparatus for measuring the mass flow of a fluid comprising a hollow, collector electrode assembly through which, in use, the fluid flows in one direction, the collector electrode assembly including a hollow, elongated first electrode axially spaced and insulated from a hollow, elongated, second electrode, the second electrode being situated downstream of the first electrode and the longitudinal axes of said electrodes being substantially co-extensive, an ionising electrode comprising a length of conductive wire supported within the collector electrode assembly so as to extend along the axis of the first collector electrode, the downstream end of the conductive wire being disposed at or adjacent the downstream end of the first collector electrode, means for applying between the ionising electrode and the collector electrode assembly a potential difference sufficient to ionise the fluid, the ions thereby produced at the ionising electrode migrating towards the first collector electrode but being displaced in the direction of fluid flow by an amount dependent upon the mass flow of the fluid, and means responsive to the number of ions migrating to the second collector electrode for measuring the displacement of the ions by the fluid flowing through the collector electrode assembly.

The apparatus described in the preceding paragraph provides a simplified modification of the apparatus according to the first aspect of the invention and can be used when the fluid flow is limited to a single direction. As before, to improve the linearity at low flow rates it may be desirable to arrange that the downstream end of the conductive wire projects by a small amount into the space occupied by the second collector electrode.

A further problem experienced with conventional mass flow measuring devices employing the corona discharge technique is that the devices tend to be inaccurate at low flow rates. This has been found to result from the composition of the support members which are mounted in the casing of the device to physically locate the ionising electrode in spaced relationship with the collector electrodes. Thus the support members must be capable of maintaining the required high potential difference between the ionising and collector electrodes and hence in conventional devices they are composed of a highly insulating material, such as a polyester typically having a bulk resistivity in excess of $10^{15}$ ohm cm. It has, however, now been found that the use of such a highly insulating material for the support members results in the build-up of a static charge on the support members which influences the ionic deflection, particularly at low flow rates, and thereby results in inaccurate measurement. It has, however, been found that this problem can be alleviated by choosing the material of the support members such that its conductivity is insufficient to result in a short-circuit between the ionising and collector electrodes, but its insulative properties are insufficient to result in a large build-up of charge on the support members. Suitable materials in this respect are phenolic resins (having a resistivity of the order of $10^{10}$ ohm cm) and melamine resins (having a resistivity of the order of $10^9$ ohm cm).

Accordingly, the invention resides in a further aspect in apparatus for measuring the mass flow of a fluid comprising a hollow, elongated casing through which, in use, the fluid flows, first and second axially spaced collector electrodes located at the internal surface of the casing and insulated from one another, an ionising electrode, at least one support member mounted in the casing and supporting the ionising electrode so that the ionising electrode is aligned with the first collector electrode but is spaced therefrom in a direction perpendicular to the fluid flow, the second collector electrode being spaced from the first collector electrode in a direction in which fluid flows in use, means for applying between the ionising electrode and the collector electrodes a potential difference sufficient to ionise the fluid, the ions thereby produced at the ionising electrode migrating towards the first collector electrode but being displaced in the direction of fluid flow by an amount dependent upon the mass flow of the fluid, and means responsive to the number of ions migrating to the second collector electrode for measuring the displacement of the ions by the fluid flowing through the casing, said support member being formed of a material whose insulative properties are sufficient to maintain said potential difference but insufficient to allow a substantial build-up of static charge on the support member.

Preferably, the material of the support member has a resistivity of between $10^9$ and $10^{10}$ ohm cm.

Preferably, the ionising electrode is defined by a length of conductive wire extends in said direction of fluid flow so that its downstream end is located at or adjacent the downstream end of the first collector electrode.

Preferably, said wire is at least 2 cm in length.

Preferably, the apparatus includes a third collector electrode axially spaced from said first collector electrode so that the first collector electrode is disposed between and insulated from the second and third collector electrodes.

In the accompanying drawings.

Figure 2:
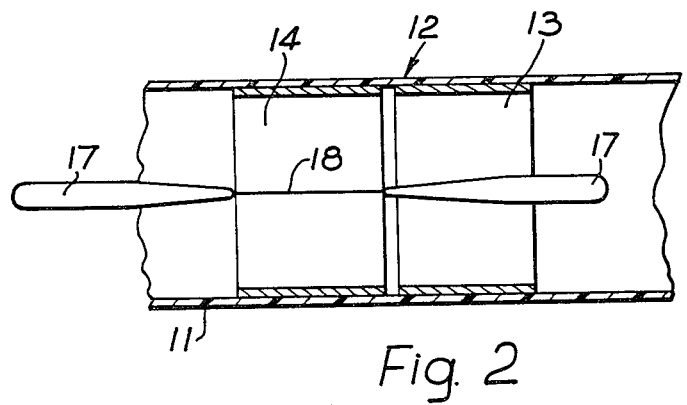

FIG. 1 is a diagrammatic illustration of fluid mass flow measuring apparatus according to one example of the invention, and FIG. 2 is a diagrammatic illustration of a modification of said one example.

Referring to FIG. 1, the apparatus according to said one example includes an outer cylindrical casing 11 which is conveniently moulded in a synthetic resin material and which typically has an internal diameter of 5 cm and a length of 20 cm. Extending along the internal surface of the casing 11 is a collector electrode assembly 12 including a pair of outer collector electrodes 13 and a central collector electrode 14 interposed between the electrodes 13. Each electrode 13, 14 is in the form of a single, hollow, stainless steel cylinder which extends co-axial with the casing 11 and typically has a length of 6 cm. Adjacent electrodes 13, 14 are spaced apart by a small gap filled with an insulating material, such as polypropylene, and the outer electrodes 13 are connected to respective inputs of a differential amplifier 15.

Covering the ends of the internal surface of the casing external to the region occupied by the electrode assembly 12 are earthed metal guard rings (not shown) and mounted in each end of the casing is a respective support member 16. Each support member 16 is in the form of a bar extending across a diameter of the casing and having a central, apertured hub portion 16a which receives one end of a respective stainless steel rod 17. Each support member 16 is composed of a material which, although non-conductive, only has poor insulating properties, a preferred material having a resistivity of the order of $10^9$ to $10^{10}$ ohm cm. Thus, for example, each support member 16 may be formed of a phenolic resin (with a resistivity of about $10^{10}$ ohm cm.) although this material is found to exhibit electrical tracking at high humidity. An alternative material, more resistant to electrical tracking, is a melamine resin, for example of a suitable material being the macerated fabric filled melamine resin supplied by the Fiberite Corporation of Minnesota, U.S.A., and having a resistivity of $3 \times 10^9$ ohm cm.

The steel rods 17 extend towards each other along the axis of the casing and terminate such that the free end of each rod is substantially aligned with the interface between the central electrode 14 and a respective outer electrode 13. At its free end, each rod 17 is of generally conical configuration, typically defining an included angle of 11° and tapering to an end surface of 2 mm radius. Stretched between the ends of the rods 17 so as to lie along the axis of the central electrode 14 is an ionising electrode 18 in the form of a conductive wire composed of a mechanically strong and chemically inert material such as a platinum/rhodium alloy, a palladium/ruthenium alloy or steel plated with platinum. By virtue of the positioning of and the spacing between the rods 17, the wire ionising electrode 18 has its centre aligned with the mid-point of the electrode 14 and is substantially confined to the region of the casing 11 occupied by the electrode 14. However, as stated above, in order to improve the linearity of the output at low values of fluid mass flow, it is preferable to ensure that the ends of the wire 18 project by small equal amounts beyond the ends of the electrode 14. The wire conveniently has a diameter of 0.05 mm and at one end passes through the associated rod 17 and support member 16 and the casing 11 for connection to an external electrical supply.

In use, when it is required to measure the mass flow of a fluid, such as air, the fluid is allowed to pass through the casing in the direction of the arrow A and the wire 18 is connected to a high voltage positive supply (2–18 kV), while the collector electrodes 13, 14 are earthed. A corona discharge is thereby generated at the ionising electrode 18 so as to produce a beam of ions of the fluid, the beam having a generally rectangular profile although exhibiting a gradual tail-off at each end of the wire 18. The ion beam is directed towards the central collector electrode 14 and, if the mass flow rate of the fluid is zero, substantially all the ions are collected by the electrode 14. In this case, the amplifier receives no input signals or, in the case where the wire 18 projects by small equal amounts beyond the ends of the electrode 14, receives small balancing input signals. Thus when the mass flow rate is zero there is no output from the amplifier 15. If, however, the fluid is flowing through the casing 11 the ion beam is displaced in the direction of the fluid flow so that, dependent upon the mass flow, some of the ions are collected by the outer electrode 13 located downstream of the electrode 14. Thus there is now a difference in the input signals to the amplifier 15 and hence the amplifier produces an output dependent on the displacement of the ions by the fluid flowing through the casing 11 and hence of the mass flow of the fluid. It will be apparent that the maximum mass flow rate which can be measured by the apparatus corresponds to the mass flow required to displace the ion beam by an amount equal to the overall length of the wire ionising electrode.

Using the apparatus described above, it is found that the generally conical shape of the wire support rods 17 improves the current density profile of the ion beam emitted by the electrode 18 and thereby improves the linearity of the output at low fluid flow rates. In addition, it is found that the use of a poor insulator for the support members 16 substantially prevents the build-up of a static charge on the members 16 and thereby improves the accuracy of the device, particularly at low flow rates. Moreover, from the materials used to produce the support members 16 and the other components of the apparatus, it will be appreciated that the apparatus is relatively inexpensive to manufacture.

It is to be appreciated that, although the dimensions of the collector and ionising electrodes in the apparatus described above can be varied from the values given, it is desirable to ensure that the wire ionising electrode 18 is at least 2 cm in length since this provides an ion beam of substantially uniform density per unit length.

In the apparatus shown in FIG. 1, since there are two collector electrodes 13 disposed on opposite sides respectively of the central collector electrode 14, it will be apparent that the apparatus can measure fluid mass flow not only in the direction of arrow A, but also in the opposite direction. In certain cases, however, it may only be necessary to measure fluid mass flow in a single direction and in such a case the simplified apparatus shown in FIG. 2 can be employed. Thus, referring to FIG. 2, in which the reference numerals of FIG. 1 are used to identify identical components in the two drawings, the modified apparatus includes a cylindrical casing 11 having a hollow, cylindrical, collector electrode assembly 12 extending coaxial with, and along the internal surface of, the casing 11. The collector electrode assembly 12 includes an elongated first electrode 14 which is insulated from an elongated second electrode 13 which is spaced from the first electrode in the direction in which fluid flows through the casing 11 in use. Stretched between a pair of spaced stainless steel support rods 17 is a wire ionising electrode 18 which extends along the axis of the electrode 14 so that its downstream end is substantially aligned with the downstream end of the electrode 14. As before, however, to improve the linearity of the output at low flow rates, the downstream end of the wire electrode 18 preferably projects by a small amount into the region of the casing 11 occupied by the electrode 13. The apparatus of this modification operates in the manner described above for the apparatus of FIG. 1.

We claim:

1. Apparatus for measuring the mass flow of a fluid comprising a hollow, collector electrode assembly through which, in use, the fluid flows, the collector electrode assembly including a hollow, elongated central electrode disposed between and insulated from first and second hollow, elongated outer electrodes, the central and outer collector electrodes having their longitudinal axes substantially co-extensive and being spaced apart in the direction of said axes, an ionising electrode comprising a length of conductive wire supported within the collector electrode assembly so as to extend along the axis of the central collector electrode with its mid-point being disposed substantially half-way between the ends of the central electrode, the length of the conductive wire being at least equal to that of the central collector electrode, means for applying between the ionising electrode and the collector electrode assembly a potential difference sufficient to ionise the fluid, the ions thereby produced at the ionising electrode migrating towards the central collector electrode but being displaced in the direction of fluid flow by an amount dependent upon the mass flow of the fluid, and means responsive to the number of ions migrating to the outer collector electrodes for measuring the displacement of the ions by the fluid flowing through the collector electrode assembly.

2. Apparatus as claimed in claim 1, wherein the conductive wire is held in tension between a pair of conductive elements which are of generally frusto-conical configuration at their ends presented to said length of conductive wire.

3. Apparatus for measuring the mass flow of a fluid comprising a hollow, elongated casing through which, in use, the fluid flows, first and second axially spaced collector electrodes located at the internal surface of the casing and insulated from one another, an ionising electrode, at least one support member mounted in the casing and supporting the ionising electrode so that the ionising electrode is aligned with the first collector electrode but is spaced therefrom in a direction perpendicular to the fluid flow, the second collector electrode being spaced from the first collector electrode in a direction in which fluid flows in use, means for applying between the ionising electrode and the collector electrodes a potential difference sufficient to ionise the fluid, the ions thereby produced at the ionising electrode migrating towards the first collector electrode but being displaced in the direction of fluid flow by an amount dependent upon the mass flow of the fluid, and means responsive to the number of ions migrating to the second collector electrode for measuring the displacement of the ions by the fluid flowing through the casing, said support member being formed of a material whose insulative properties are sufficient to maintain said potential difference but insufficient to allow a substantial build-up of static charge on the support member.

4. Apparatus as claimed in claim 3, wherein the material of the support member has a resistivity of between $10^9$ and $10^{10}$ ohm cm.

5. Apparatus as claimed in claim 3 and further including a third collector electrode axially spaced from said first collector electrode so that the first collector electrode is disposed between and insulated from the second and third collector electrodes.

6. Apparatus as claimed in claim 3, wherein the ionising electrode is defined by a length of conductive wire which extends in said direction of fluid flow so that its downstream end is located at or adjacent the downstream end of the first collector electrode.

7. Apparatus as claimed in claim 1 or 6 wherein the wire is at least 2 cm in length.

* * * * *